United States Patent
Ganzevoort

(10) Patent No.: US 7,942,533 B2
(45) Date of Patent: May 17, 2011

(54) LARGE-SIZED TRANSPORTABLE PROJECTION SCREEN

(75) Inventor: Günter Ganzevoort, Gladenbach-Weitershausen (DE)

(73) Assignee: biggAIR GmbH, Hanau (DE)

(\*) Notice: Subject to any disclaimer, the term of this patent is extended or adjusted under 35 U.S.C. 154(b) by 479 days.

(21) Appl. No.: 12/064,037

(22) PCT Filed: Aug. 15, 2006

(86) PCT No.: PCT/EP2006/008034
§ 371 (c)(1),
(2), (4) Date: May 24, 2008

(87) PCT Pub. No.: WO2007/020044
PCT Pub. Date: Feb. 22, 2007

(65) Prior Publication Data
US 2008/0231815 A1  Sep. 25, 2008

(30) Foreign Application Priority Data
Aug. 16, 2005  (DE) .................... 20 2005 013 031 U

(51) Int. Cl.
*G03B 21/58* (2006.01)
(52) U.S. Cl. ..................... 353/79; 359/450; 359/460
(58) Field of Classification Search ................ 353/79; 359/460, 450
See application file for complete search history.

(56) References Cited

U.S. PATENT DOCUMENTS

| 4,802,734 | A | | 2/1989 | Walter |
| 5,617,662 | A | * | 4/1997 | Hwang ........................... 40/736 |
| 6,008,938 | A | | 12/1999 | Suehle et al. |
| 7,114,276 | B2 | * | 10/2006 | Scherba ......................... 40/610 |
| 7,181,877 | B2 | | 2/2007 | Quade |
| 7,213,357 | B2 | | 5/2007 | Scherba |
| 7,397,603 | B2 | * | 7/2008 | Peterson et al. ............. 359/443 |
| 7,446,937 | B2 | * | 11/2008 | Poretskin ..................... 359/443 |

FOREIGN PATENT DOCUMENTS

| DE | 3028258 | 3/1982 |
| DE | 10034912 | 2/2002 |
| DE | 20318473 | 3/2004 |
| WO | 2005/019568 | 3/2005 |

\* cited by examiner

*Primary Examiner* — Seung C Sohn
(74) *Attorney, Agent, or Firm* — Bachman & LaPointe, P.C.

(57) ABSTRACT

A large-sized transportable projection screen comprising an any-shaped fillable hollow body, which is embodied in the form of a structure consisting of fillable tubes. The aim is to develop a large-sized transportable projection screen exhibiting an increased stability and making it possible to obtain an improved projection at daylight. For this purpose, the structure defines a three-dimensional internal space limited on all sides thereof, wherein the tubes are oriented in three directions in space and the internal space is limited by at least one display surface arranged at the level of an edge formed by a part of tubes.

19 Claims, 11 Drawing Sheets

LARGE-SIZED TRANSPORTABLE PROJECTION SCREEN

BACKGROUND OF THE INVENTION

The invention relates to a large-sized transportable projection screen, having a fillable, shape-variable hollow body in the form of a structure made of fillable tubes.

A large-sized projection screen is known from US 2004/0211100 A1. WO 02/47057 A1 describes another apparatus with a three-dimensional construction for displaying visible images, with an inflatable body and a base. The body is formed by tube-like parts which, in the inflated state, have a predetermined shape in order to provide at least one display surface for displaying the visible images. U.S. Pat. No. 6,008,938 describes another transportable projection screen which can be inflated with cold air and is clamped between two inflatable towers and an inflatable tube connecting the towers. The two-dimensional structure is held upright by holding lines and extension arms fastened to the towers and is fastened to the ground.

A further two-dimensional projection screen has, according to DE 3028258 A1, a flexible, concave projection surface and an inflatable frame, and therefore said frame can be placed under pressure for stiffening purposes and in order to keep the projection surface stretched, with the frame being designed in such a manner that it forms a stray-light shade. Planar, two-dimensional large-sized projection screens which have inflatable supports are also known.

A planar structure of a large-sized transportable projection screen is known from DE 100 34 912 A1 and DE 203 18 473 U1. In DE 100 34 912 A1, a frame is formed by bringing together the ends of elongated tubes which can be filled with gaseous media and are made of flexible materials. According to DE 203 18 473, a virtually flat, inflatable hollow surface is formed, said hollow surface being formed from a plurality of individual, fixedly interconnected, sequentially fillable hollow bodies which are arranged parallel to one another. This planar structure also requires ropes, straps or rods for anchoring the structure in a stabilizing manner on the ground.

A screen which can be inflated with cold air, is inflated in a manner similar to a balloon and which is also bounded by walls formed by pockets which can likewise be inflated is known from U.S. Pat. No. 4,802,734. In order to keep the balloon-like structure in shape, the top and bottom surfaces within the balloon are pulled counter to each other by ropes. Only a curved realization of a projection surface is possible with the balloon-like structure. It also has an extremely high loss of air for the operation and, due to the pressurized interior filling, can only be walked on to a limited extent.

It would be desirable to improve both the stability and the picture quality of a large-sized projection screen.

This is the starting point of the invention, the object of which is to provide a large-sized transportable projection screen, the stability and picture quality of which are substantially improved.

SUMMARY OF THE INVENTION

The object is achieved by the invention wherein a large-sized projection screen comprises a three-dimensional internal space which is defined by the structure and is bounded on all sides, with the tubes being oriented in three directions in space, and with the internal space being bounded by at least one display surface which is arranged on an edge formed by one part of the tubes.

A tube is understood as meaning, according to the invention, any desired, fillable, shape-variable hollow body of elongate design. In this case, a tube can adopt both a bead-like shape determined to a greater or a lesser extent by the internal pressure and also—as also explained in detail—a defined, for example, cylindrical shape with any desired predetermined base area.

In other words, by means of the tubes which are oriented in three directions in space, the structure according to the invention forms a scaffolding-like or framework-like construct, by means of which the three-dimensional internal space is defined, i.e. there are open scaffolding or framework areas between the tubes.

The invention has recognized that, owing to the three-dimensional structure formed by the tubes, a hollow body is formed which, owing to its three-dimensional configuration, has intrinsic stability—as compared with the large-sized transportable projection screens which are mentioned at the beginning and are essentially realized only in two-dimensional form, the intrinsic stability as a rule not having to be ensured by additional ropes, frames or supporting structures. In other words, the invention has recognized that, with the large-sized transportable projection screen formed according to the above concept, a fillable, shape-variable hollow body is provided which can be filled within a very short period of time—for example within 10 to 30 min., and, in the process, develops intrinsic stability. The anchoring measures which are especially time-consuming and expensive are avoided with the large-sized transportable projection screen according to the above-described concept. Furthermore, operations at a height of customarily some meters are also avoided with the large-sized transportable screen according to the present concept. In general terms, it virtually involves a "turn-key system", in which the large-sized transportable projection screen is provided by the filling of the shape-variable hollow body without further measures.

Furthermore, the large-sized transportable projection screen according to the present concept has considerably improved picture quality over the customary large-sized projection screens which are of planar and two-dimensional design. This is achieved above all by the fact that, in addition to the possibility of projection in dark surroundings, the possibility of projection in daylight conditions is also provided. The invention has recognized in this case that, in order to improve the image quality, a projector in the internal space of the structure can be arranged for rear-side projection onto the display surface, with the internal space expediently being bounded on all sides in order to form a space which is darkened against light incidence from the outside, preferably in order to form a dark chamber. In other words, the intermediate spaces formed by the scaffolding or framework of the tubes are advantageously bounded on all sides by light-proof darkening surfaces. That is to say, the internal space is preferably bounded by further darkening surfaces which are arranged on further edges formed by a further part of the tubes. The internal space of the structure is thereby darkened, which permits considerably improved rear projections onto the display surface even during daylight. In contrast thereto, the two-dimensional large-sized projection screens mentioned at the beginning are suitable only for projections in dark surroundings, since they do not have a darkened space for the arrangement of the projector. One darkening surface is preferably formed by a display surface.

According to the present invention, a display surface is understood as meaning, in particular, a projection surface. In this case, the projection surface is formed in the form of a rear projection surface, i.e. a projection surface which is impinged upon from the rear side—for example by a projector arranged in the structure—by an image which can be viewed from the front side—i.e., for example, by an audience looking at the large-sized transportable projection screen from the outside. In this case, it also lies within the scope of the concept of the present invention to use the display surface as a surface for displaying images which are not projected—either from the front side or rear side. Images of this type may be provided on the display surface, for example in the form of advertising images.

Consequently, it also lies within the scope of the concept of the present invention, to arrange not only one display surface but rather a multiplicity of display surfaces on an edge or edges formed by a further part of the tubes, which display surfaces can serve in each case either for the projection of moving or non-moving images or as a large display surface for non-projected images. For example, a structure also lies within the scope of the concept of the invention, in which only a single display surface is used as the projection surface and the further display surfaces—for example at the sides and on the roof—are used as advertising surfaces. The concept also includes a structure in which all of the available display surfaces or at least all of the lateral display surfaces are used as projection surfaces. For this purpose, a corresponding number of projectors or a projector guided in an appropriately movable manner in order to impinge in an alternating manner on the display surfaces can be arranged within the internal space.

According to the invention, the internal space forms a space which is darkened against light incidence from the outside. The all-sided boundary expediently has light-proof surfaces. The latter are preferably formed in the form of a display surface. In this case, it has proven particularly advantageous to design one surface to be dark on the inside and to be bright on the outside. This also counteracts a heating up of the internal space.

As already mentioned, it is advantageous, in particular for the provision of a large-sized transportable projection screen for daylight conditions, that the internal space is bounded on all sides in order to form a dark chamber. The boundary may be formed by non-inflatable darkening surfaces which, depending on requirements, can likewise be used as display surfaces—either as a projection surface or as a simple printed display surface. Less advantageous, but nevertheless conceivable, is also the possibility of arranging between the tubes planar, fillable, in particular inflatable elements which are fastened releaseably or non-releaseably. This would have the advantage, however, that the dark chamber formed by the structure can be entirely provided by the fact that the tubes and the planar elements are filled, preferably inflated. Further removal or covering of the open surfaces of the structure is therefore unnecessary. Irrespective of the manner in which the dark chamber structure is realized, the fillable tubes of the structure constitute a three-dimensional scaffolding or framework which imparts inner stability and intrinsic stability to the large-sized projection screen.

In accordance with the invention, it is provided to arrange the display surface which is arranged on an edge formed by one part of the tubes on a side of the tubes which faces the internal space. In other words, in this embodiment, the display surface is set back from the outside to the inside, toward the internal space. As a result, owing to the tubes which are, as a rule, of large-sized design, a shadow space is formed in front of the display surface. In this development, use is advantageously made of the fact that the tubes are already of a size sufficient for forming light protection. In the case of a tubular frame structure around the display surface, a shadow space which bounds the display surface on all sides is therefore provided, the shadow space limiting the light incidence from the outside in a particularly preferred manner. It has been shown that this brings about a very considerable improvement in the light conditions in the region in front of a display surface, in particular in the region in front of a projection surface. Even in the case of weak-light projectors, a projection in daylight conditions can nevertheless be realized with the large-sized projection screen according to this development. As an alternative, cost-effective projectors, such as, for example, a beamer, can be used.

In order to improve the shadow space, it is provided in particular to provide a tube which forms the edge with a diameter which corresponds at least to one third of the height of the display surface.

Advantageous developments of the invention are to be found in the subclaims and in particular provide advantageous possibilities for realizing the above-explained concept of the invention within the scope of the objective and also with regard to further advantages.

A filling medium is preferably air, in particular, cold air. Heated air or hot air may also be advantageous in winter. Further filling media, such as water or gas (for example $N_2$ or $N_e$) are likewise possible.

A preferred development of the invention makes provision for the tubes to be formed from a flexible two-wall material, between the two walls of which connections which define a predetermined distance between the walls of the two-wall material are arranged. A two-wall material of the above-mentioned type can be found in the international application which has not yet been published and was filed under the official designation PCT/EP2004/009040 on Aug. 12, 2004, the disclosure of which, in particular in respect of the design of the two-wall material, is herein incorporated into the disclosure of this application by this citation. A two-wall material of this type is formed in the form of a non-woven fabric, between the two walls of which there are connections. These connections may be, in particular, threads which are woven into the woven structure of the two-wall material and which, by means of their length, define a maximum distance between the walls of the two-wall material. A cavity is formed around the connections between the walls, which cavity can be filled in principle with any desired fluid, in particular with air as medium, in order to stiffen the material and, in the process, is closed in an air-proof manner. The two-wall material is shown in particular in FIGS. 1, 2 and 3, of the publication mentioned and is explained with reference thereto. The use of the above-mentioned two-wall material for the tubes permits virtually any desired shape to be realized for the tubes. Without the use of the two-wall material, tubes can be of bead-like design—essentially defined by the size of their covering. Furthermore, when the two-wall material is used, a tube can be assigned a predetermined, defined shape, for example a cylindrical shape with a rectangular basic cross section or hexagonal basic cross section—depending on requirements.

The abovementioned two-wall material can also be used particularly advantageously for inflatable planar elements which, according to the abovementioned development, can be arranged on the tubes in a releasable or non-releasable manner in the intermediate spaces of the structure formed by the tubes.

The tubes, or planar elements, preferably communicate with one another via filling openings. In particular, the tubes, even in the case of an abovementioned development, can communicate with a planar, fillable—in particular inflatable—element via filling openings. As a result, the structure of the large-sized transportable projection screen can advantageously be filled by a single connection. In other words, fillable elements, in particular the tubes of the structure, are filled, in particular inflated, together and at the same time. However, this does not rule out separate structure elements or tubes which are joined or can be joined to one another being also able to be filled independently of one another, i.e., if appropriate, successively.

As already mentioned above, it has proven advantageous within the scope of a particularly preferred development for the structure to be free from planar, fillable partial hollow bodies. In other words, the hollow body in the form of the structure is composed entirely of the tubes. This guarantees the intrinsic stability of the hollow body, and a dark chamber can be realized in a particularly simple manner by removal of the intermediate spaces.

Furthermore, it has proven particularly advantageous within the scope of a development for a light shield and/or one or more panels to be arranged at the edge. This applies in particular to the edge on which a display surface used as the projection surface is arranged. According to this development, not only is light incidence from the back of the projection screen therefore limited—by the realization of a dark chamber, but also light incidence onto the projection surface from the front side is limited by the light shield. The light shield advantageously forms a shadow space in front of the display surface, in particular the projection surface. The capability of the large-size projection screen to operate in daylight conditions is thereby further improved.

A projector for rear projection onto the projection surface is preferably arranged in the internal space of the large-sized projection screen in a manner such that it can be adjusted variably in position. In particular, a projector is arranged in a height-adjustable manner, for example on a lifting platform. In particular, the light intensities of the projector on the rear side of the projection surface can thereby be matched to the light conditions prevailing outside the large-size projection screen.

Different embodiments have proven advantageous with regard to the design of the display surface. In the case of a projection surface, the latter is advantageously formed in the form of a semi-transparent screen. Depending on the surrounding light conditions, said screen may be designed to be a light milky color or else brownish beige. In the case of a display surface in the form of printing surfaces, for example in the form of mega-print screens, the display surface can be designed in a particularly advantageous manner as a tarpaulin. Such a tarpaulin may be holed or perforated. This has advantages in terms of weight.

For the attachment of a display surface, a tube which forms the edge preferably has an eyelet strip.

In order to permit entrance to the structure, it is advantageously provided that at least one point at the edge of a base area of the structure is free from tubes. In other words, a tube which edges the base area of the structure #15 has an interruption or ends at an entrance opening. Such an entrance is provided in particular on the rear side, i.e. that side of the structure which lies opposite the projection surface.

For the structure, in principle very different spatial geometries can be realized in accordance with the concept of the invention. In particular with regard to the format, an image format which is customary for cinema presentations and in which the structure surrounds a cube-shaped internal space has proven particularly advantageous. Furthermore, three-dimensional shapes in the form of a cuboid, a sphere or spherical cap or a polyhedron are also possible. Cylindrical shapes with any desired base area can also be realized.

While the invention proves particularly useful for projection displays relevant to the use and is to be understood within this context and while the invention is also described in detail below with reference to examples which relate to the projection of moving images onto a large-sized projection screen, it should nevertheless be clear that the concept described here, as claimed, is likewise usable within the scope of other applications which lie outside the projection of movable images and concern uses which do not lie within the sphere of cinema or image transmission. For example, the concept presented could likewise be used for pure advertising purposes or in general in order to realize devices which require an intrinsic stability to be preferential. One example of this in the case of a cubic large-sized projection screen would be the use as a pure advertising cube. The concept could advantageously also be used, for example, to realize a simple display object or in order to realize platforms on which displays are to take place.

The large-sized projection screen can preferably have dimensions which are clearly more than two meters for length, width and height. Dimensions of around five to ten meters are particularly advantageous. A tube may have a diameter of significantly more than one meter.

Exemplary embodiments of the invention are described below with reference to the drawing in comparison to the prior art. The drawing is not intended to illustrate the exemplary embodiments to scale but rather is executed in a schematized and/or slightly distorted form wherever expedient for the purposes of explanation. For supplementary information about the teachings which can be directly discerned from the drawing, reference is made to the relevant prior art.

It should be taken into account here that various modifications and changes to the form and details of an embodiment can be made without departing from the general concept of the invention. The features of the invention which are disclosed in the description above, in the drawing and in the claims may be essential to the development of the invention either individually or in any desired combination. The general concept of the invention is not restricted to the precise form or the detail of the embodiments which are shown and described below or restricted to a subject matter which would be constricted compared to the subject matter claimed in the claims. For specified ranges of dimensions, values which lie within the aforesaid limits should also be disclosed as limiting values and be capable of being used and claimed as desired.

BRIEF DESCRIPTION OF THE DRAWINGS

In order to explain the invention further, a preferred embodiment of the invention using the example of a large-sized projection screen with a projection surface for moving images is explained with reference to the figures of the drawing. In the drawing.

DETAILED DESCRIPTION

Figure 1:
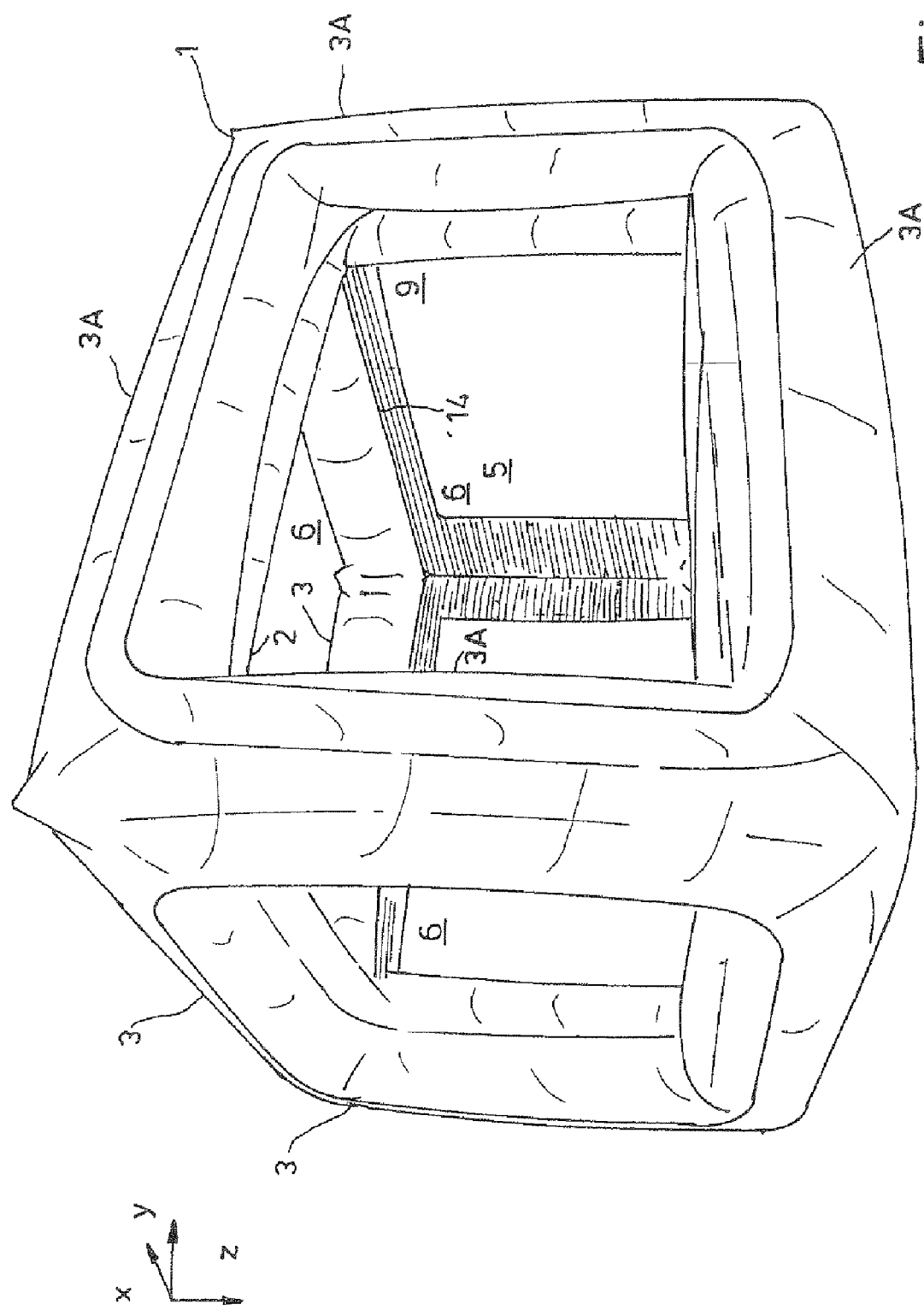
FIG. 1 shows a perspective view of a structure of a large-sized projection screen according to a particularly preferred embodiment of the invention as illustrated graphically in FIG. 6 to FIG. 11.
Figure 3:
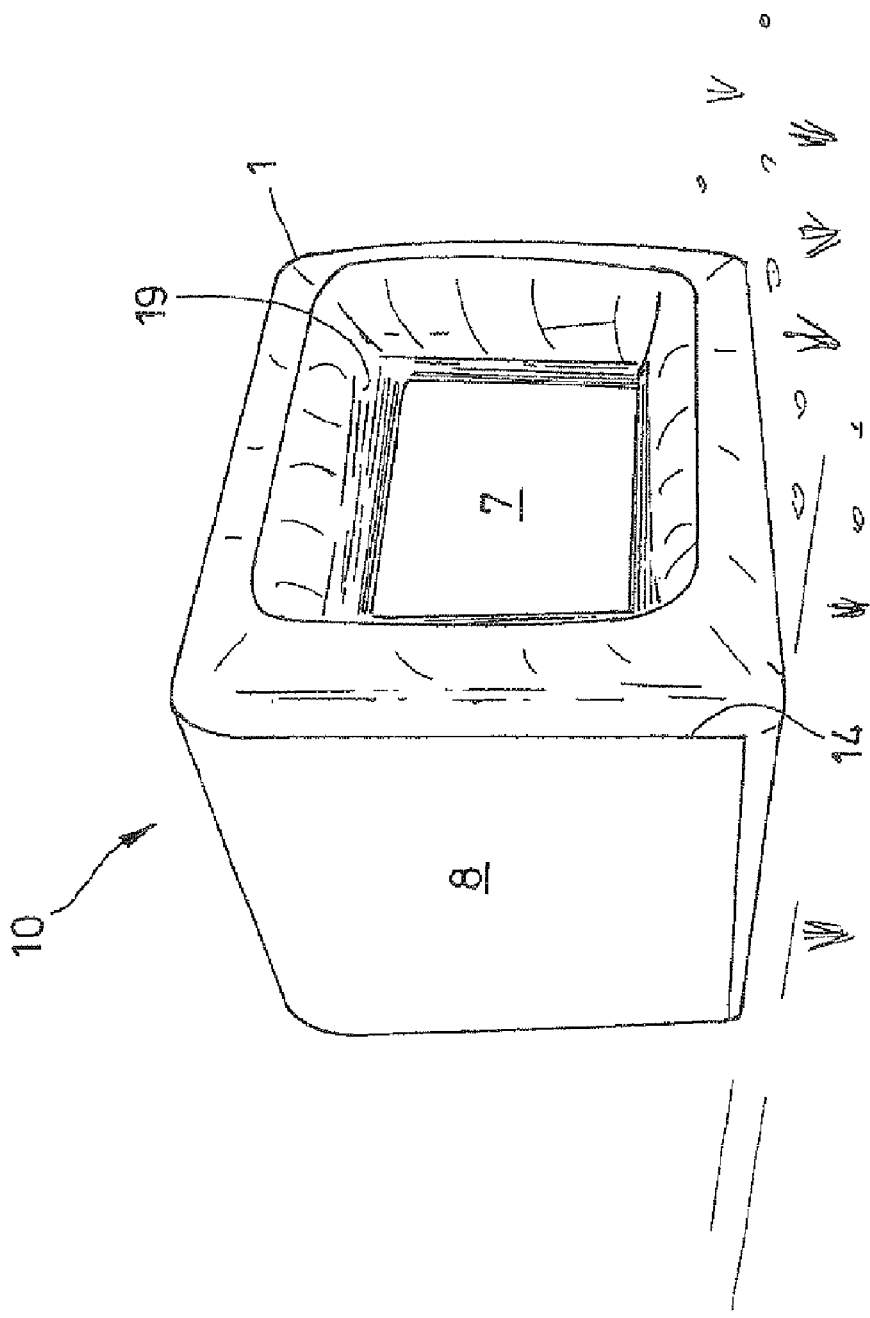
FIG. 3 shows a perspective illustration of the large-sized projection screen with display surfaces inserted, with, according to a particularly preferred embodiment, the projection surface being set back and further display surfaces for accommodating advertising surfaces being removed and, as a result, a large-sized projection screen capable of projection in daylight conditions and with a dark chamber for accommodating the projector being formed.

FIG. 1 shows a hollow body 1 which is fillable, here with cold air, is inflatable and shape-variable and is in the form of a structure 1 made of fillable tubes 3 as part of a large-sized transportable projection screen. The tubes 3 serve here to define a three-dimensional internal space 5, which is defined by the structure 1 and is surrounded here by it, and, for this purpose, are oriented in three directions in space x, y, z. As shown in FIG. 3, the internal space 5 is bounded by at least one display surface 7, in the present case in the form of a projection surface. In the present case, the projection surface 7 is arranged on an edge formed by one part of the tubes 3A. In particular, in the embodiment described here, the internal space 6 is bounded on all sides by further display surfaces 8, of which one can be seen in FIG. 3, in order to form a dark chamber. In other words, the planar intermediate space 9 which is shown in FIG. 1 and is formed by the framing tubes 3A is covered by the projection surface 7 shown in FIG. 3, and the further planar intermediate spaces 6 shown in FIG. 1, in the case of the scaffolding/framework of the structure 1 that is formed by the tubes 3, are covered by further display surfaces 8. The tubes 3, 3A therefore form a bordering structure 1 which defines the internal space 5 here on all sides and in this sense surrounds it while the lateral intermediate spaces between the scaffolding/framework of the tubes 3, 3A are covered by display surfaces—either in the form of a projection surface 7 or in the form of an advertising surface 8. The large-sized transportable projection screen of the embodiment described here is thereby designed in the form of a large-dimensioned, three-dimensional structure similar to a cube in order to permit screen projections during mobile use in daylight conditions.

Figure 4:
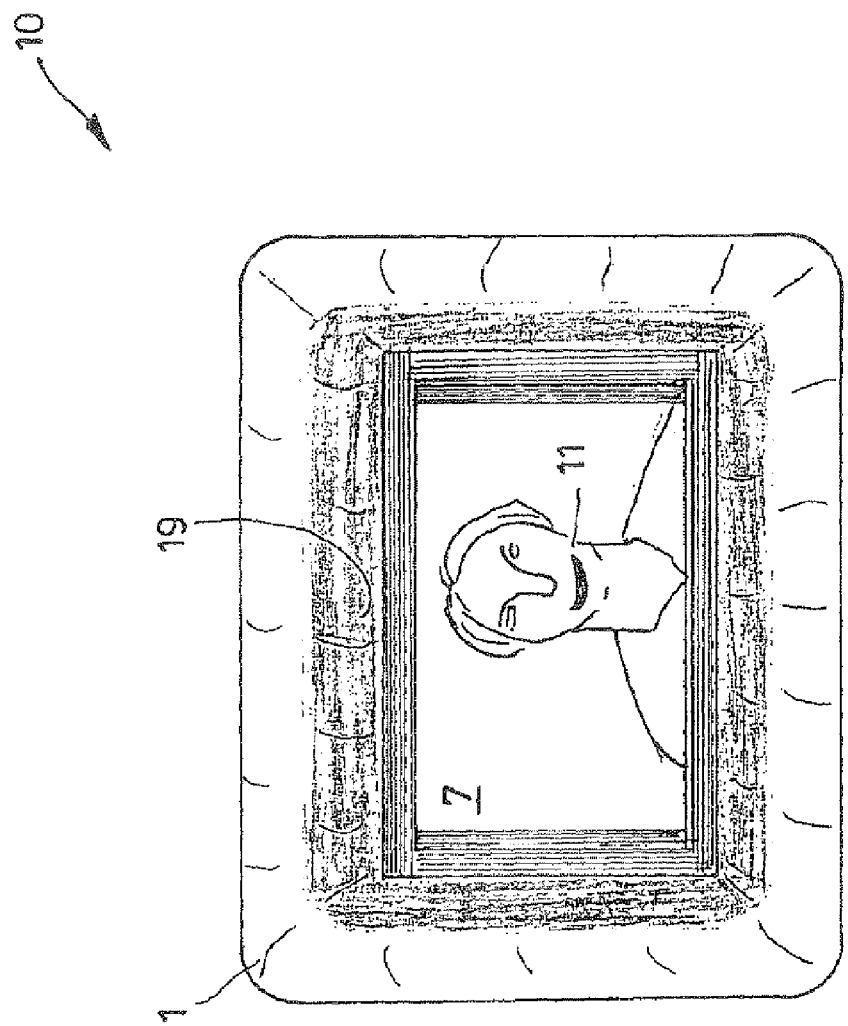
FIG. 4 shows a perspective frontal view of the large-sized projection screen of FIG. 1.

Use is made here of the technique of rear projection from a darkened space formed by the internal space 5. As can be seen in FIG. 4, a projector which is located in the dark internal space 5 and is described in more detail in FIGS. 5 to 11 is used in order to project an image 11 onto a special rear projection film which forms the projection screen 7 and on which an observer can see the image 11 from the outside with sufficient brightness and contrast even during daylight conditions. Without the internal space 5 designed as a dark space, such a projection during daylight conditions would be virtually impossible. This is the most serious disadvantage of the two-dimensional screens of the prior art explained at the beginning. Furthermore, the particularly preferred embodiment described here of the large-sized transportable projection screen ensures stability and mobility to a particularly improved extent owing to the structure 1 of an inflatable tubular frame, which structure is formed by tubes 3, 3A. The tubes have a comparatively large tube diameter in the range of 1.5 m. A special fan blower shown in FIGS. 5 to 11 ensures a simple and sufficiently stable construction of the structure 1 which, as a result, has sufficient intrinsic stability even during adverse weather conditions.

Figure 2:
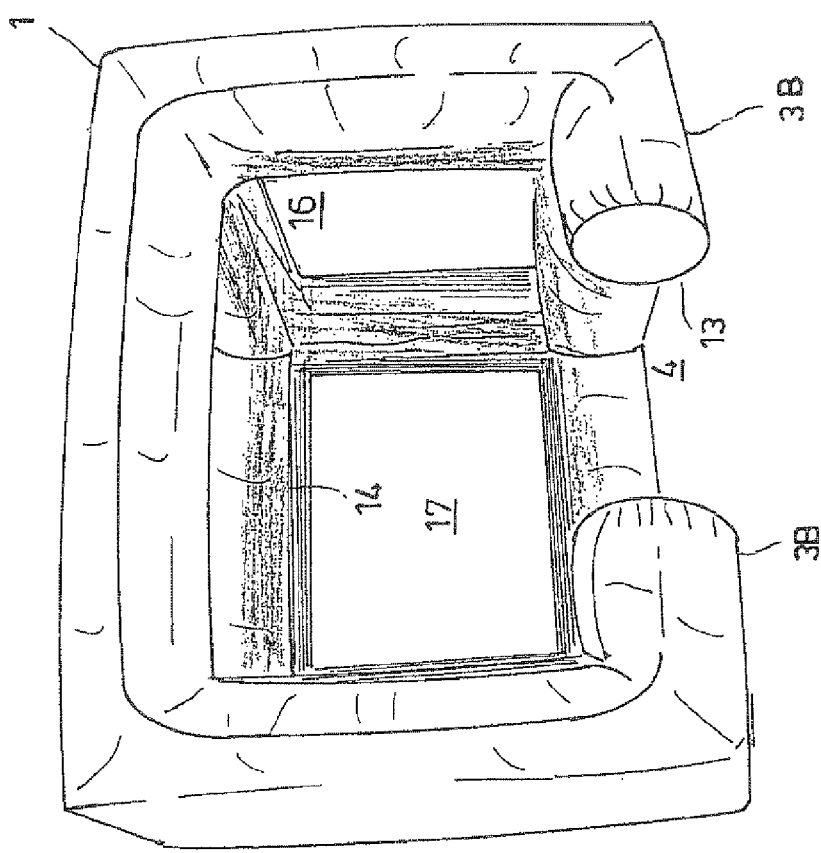
FIG. 2 shows a perspective rear view of the structure of the large-sized projection screen of FIG. 1.

The main characteristic of the large-sized projection screen, which is illustrated perspectively in FIG. 3 and FIG. 4, lies in the projection of transmissions. However, film and advertising presentations can likewise also be shown. Furthermore, the side surfaces and the back wall are designed for the attachment of advertising prints. For this purpose, the structure 1 has, inter alia, eyelet strips 14, which are indicated in FIG. 1 and FIG. 2, for the attachment, for example, of a projection surface 7. Furthermore, it can be seen in the perspective rear view of FIG. 2 that at least one point 13 at the edge of a base area 4 of the structure 1 is free from tubes. In other words, a tube 3B which borders the base area 4 of the structure 1 has an interruption 13 for the interruption of the tube-free point 13. The point 13 serves as an opening in order to permit people to enter at the rear side, i.e. on the side 16 lying opposite the side 17 provided for the projection surface 7.

Two different materials are chiefly used in order to produce the large-sized projection screen 10.

In the case of the embodiment described here, all of the tubes 3, 3A, 3B of the structure 1 are produced from a PCV-coated artificial fiber. Said fiber achieves sufficient stability at an internal pressure, which is to be set up in accordance with requirements, during the inflation of the tubes 3, 3A, 3B. Furthermore, an artificial fiber of the type mentioned has proven sufficiently durable since, during repeated dismantling and construction within the course of long-term use of the large-sized projection screen 10, both durability and airtightness are ensured.

The planar intermediate spaces 6, 9 indicated in FIG. 1 and the planar intermediate spaces 17, 16 indicated in FIG. 2 are provided for darkening purposes. In the case of the embodiment illustrated here, a darkening film 8 which is illustrated in FIG. 3 and is fastened to an eyelet strip 14, which is provided on the outside of the structure 1, serves for this purpose. The darkening film 8 serves as a display surface and, in addition, is impermeable to daylight and is water-proof. That is to say, even when there is increased sunshine, the internal space is reliably darkened and protected against overheating.

The large-sized projection screen 10 has proven completely mobile and can be constructed and dismantled extremely flexibly. Construction and dismantling are particularly uncomplicated, since all of the elements important for a screen presentation are fastened to the inflatable tubes 3, 3A, 3B. The selection of the location can be as desired, since even non-secured underlying surfaces, such as grassy areas, earth, sand and the like do not have an adverse effect on the stability. Despite the intrinsic stability of the large-sized projection screen 10 ensured by the structure 1, nevertheless no damage is caused to the underlying surface. Furthermore, specialized staff do not necessarily have to be acquired for the construction, since a responsible introduction to the object is sufficient in terms of safety for the construction and dismantling and for the operation of the large-sized projection screen 10. After the air is let out of the structure 1 and, in the collapsed state, the hollow body 1 is accommodated on a Europallet in order to be able to be transported to the next location.

Furthermore, the embodiment illustrated here has particular safety advantages. As already explained, solid components which could cause damage in the event of a current failure are not used. Even if people are located in the internal space 5 of the structure 1 as the air is being let out, there is no risk to the people during the lowering operation because of the low weight of the woven fabric forming the structure 1. The intrinsic stability and the reliability of the intrinsic stability are ensured above all by the provision of ballast in the lower edge region of the internal space. The intrinsic stability can be further increased, for example, also by means of weight barrels 15, which are illustrated in more detail in FIG. 7. Dimensions in the range of a diameter of 0.7 m and a height of 1.2 m are suitable for the realization of a weight barrel 15 of this type. Weight barrels filled with water increase the intrinsic stability of the structure 1 even further against sliding and tilting, for example should strong winds or squalls occur. In the event that, in the case of bad weather and severe storms or hurricanes, essential locking of the large-sized projection screen 10 or of the structure 1 to the ground has to be ensured, there is the possibility, as also in the case of known concepts, to fasten the structure 1 to the ground by means of ropes. In this case, both weights and earth anchors may be used. These additional safety measures are not illustrated in FIGS. 1 to 11, since they are not necessary for the intrinsic stability of the structure 1 or of the large-sized projection screen 10 under normal ambient conditions.

The particularly preferred embodiment of the large-sized projection screen 10 shown in FIG. 1 to FIG. 4 has a tube diameter of 1.5 m and an overall weight in the constructed state of approximately 500 kg. It operates with display surfaces which have a white color to the outside and a dark color, for example black, to the inside. In particular, a darkening film made of coated PVC material is used as the darkening film. This is preferably a PVC film which is hardly inflammable and at most scorches even at high flame temperatures. The locking barrels 15 used to increase the intrinsic stability have a water-holding capacity of 350 liters.

In the case of the particularly preferred embodiment 10, described here, of a large-sized projection screen, a further convincing measure for realizing weakened light conditions even during projection in daylight conditions is the realization of a shadow space 19, which can clearly be seen in FIG. 3 and FIG. 4, in the region in front of the projection surface 7. It is provided in this case that the display surface 7, which is arranged on an edge formed by one part of the tubes 3A, is arranged on a side which faces the internal space 5—i.e. the inner side 2 of the tubes 3A. As can clearly be seen in FIG. 3, the display surface 7 which is designed as a projection surface is set back from the outside to the inside in order to form the shadow space 19 in front of the display surface 7. In this case, the bead-like tubes 3A which form the frame form a light protection which limits a potential light incidence on the display surface 7 from the front. As can likewise be seen in FIG. 3 and FIG. 4, the tubes 3A here have a diameter which corresponds approximately to half of the height of the display surface 7. A sufficient light-shielding effect is thereby realized by the tubes 3A. Nevertheless, in a development of the embodiment explained here, a light shield can additionally be arranged on the tubes 3A. The latter can be extended or anchored, for example, in the form of a canvas blind or an upper and/or lateral panel, if appropriate a plurality of upper and/or lateral panels or the like. At least one panel arranged below the display surface 7 may also prove expedient sometimes.

In FIG. 5 to FIG. 11, the preferred embodiment of a large-sized projection screen 10 that is explained in FIG. 1 to FIG. 4 is illustrated as a technical drawing in corresponding sides and sectional views. A size, which is suitable in particular for a cinema and television format, for the large-sized projection screen 10 is indicated here by way of example in the form of meters as the dimensions.

Figure 5:
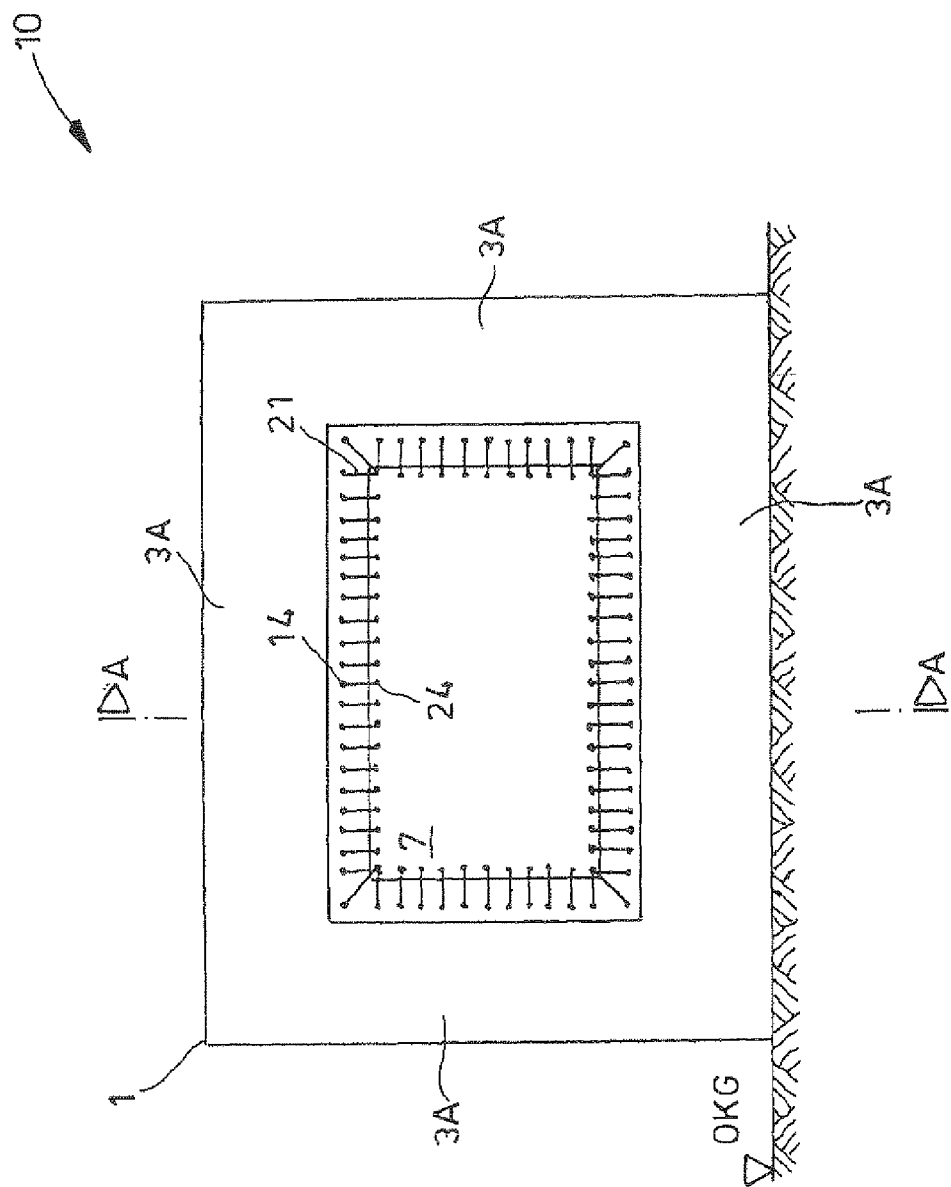
FIG. 5 shows a front view of a large-sized projection screen of FIG. 3 according to a particularly preferred embodiment of the invention.

FIG. 5 shows a front view of the large-sized projection screen 10 with the structure 1, in which, in the front view present, the tubes 3A which form the frame for the projection screen 7 can be seen. The projection surface 7 is fastened to the structure 1 and to the tubes 3A by clamping connections 21 and corresponding eyelet strips 14 and by a further eyelet strip 24 on the projection surface 7. The projection surface itself has a size of 4.8 m×2.7 m. Other dimensions can likewise be realized that are preferably of between two and five meters in length or width.

Figure 6:
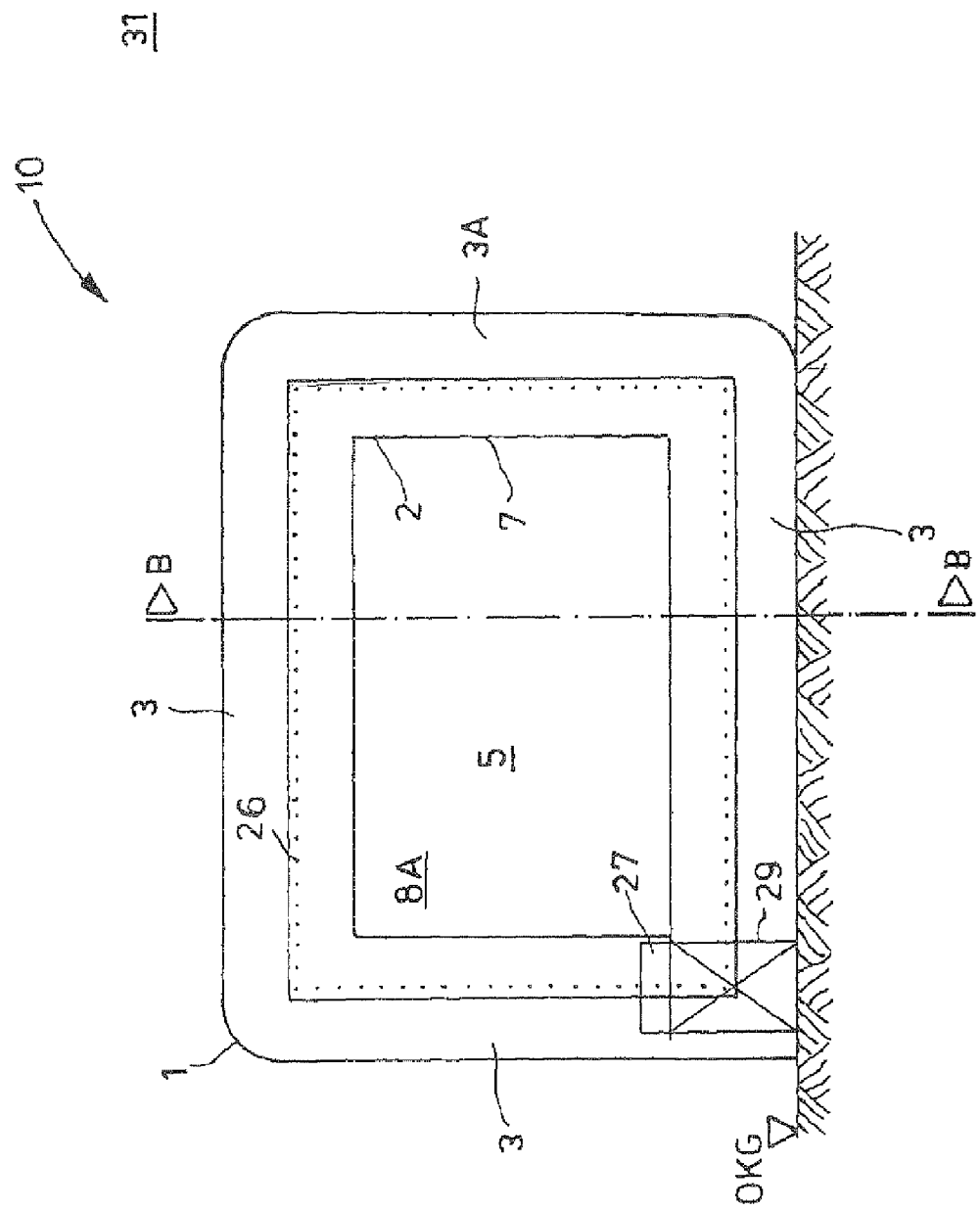
FIG. 6 shows a side view of the large-sized projection screen of FIG. 3.

The side view illustrated in FIG. 6 shows tubes 3 and 3A of the structure. The display surface which is realized in the form of a darkening of the side wall is designed as an alternative to the display surface 8 of FIG. 3. The side wall 8A illustrated in FIG. 6 is fastened to the outside of the structure 1 via an eyelet strip connection 26. It has a size in the present case of 7.3 m×5.2 m. FIG. 6 furthermore shows, as concealed elements of the internal space 5, the display surface 7, which is designed as the projection surface, on the inside 2 of the tubes 3A. Furthermore, the projector 27 which is arranged in the internal space 5 and is arranged on a height-adjustable lifting platform 29 is shown. Via the height positioning of the projector 27 by means of the lifting platform 29, the light conditions on the rear side of the projection wall 7 can be set in such a manner that they are appropriate for the light conditions of the surroundings in the external region 31 of the large-sized projection screen 10.

Figure 7:
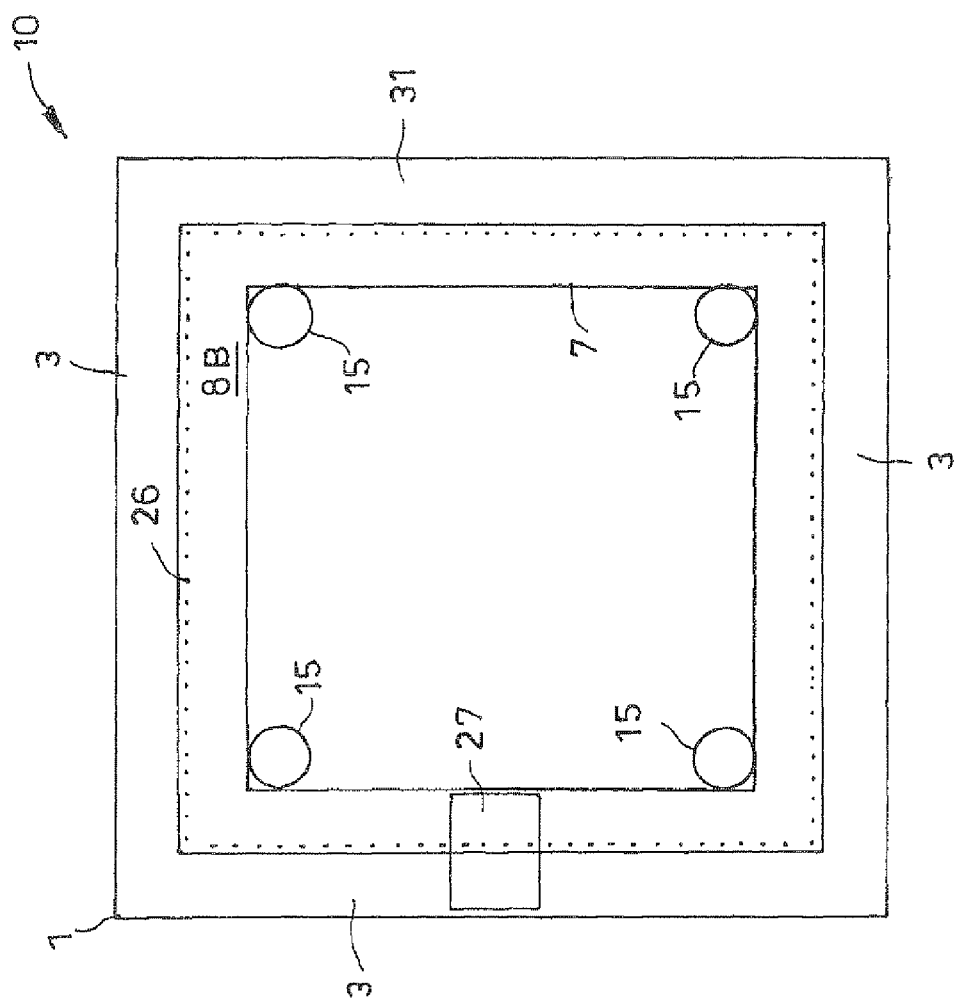
FIG. 7 shows a plan view of a large-sized projection screen of FIG. 3.

FIG. 7 shows the plan view of the large-sized projection screen 10 with the fastening barrels 15 which serve to ensure the intrinsic stability. A display surface 8B which forms the roof serves in addition for darkening purposes and, in a similar manner as in FIG. 6, is fastened to the tubes 3 and 3A of the structure 1 via an eyelet connection 26. In the present case, the display surface 8B has a size of 7.3 m×7.3 m. All of the other reference numbers are selected as in FIG. 6.

Figure 8:
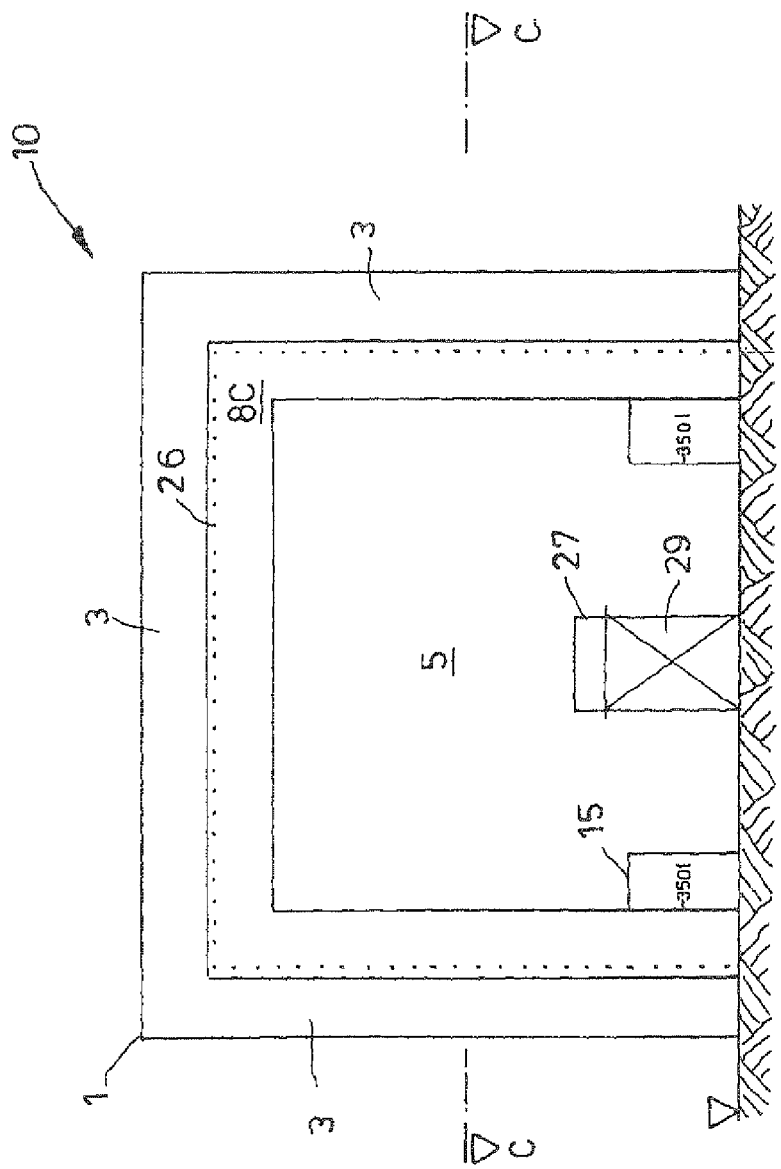
FIG. 8 shows a rear view of a large-sized projection screen of FIG. 3.

In the rear view, illustrated in FIG. 8, of the large-sized projection screen 10, the elements which have already been explained are each provided with the same reference numbers as in the previous figures. In a modification of the structure 1 illustrated in FIG. 2, the provision of an interrupted tube 3B—in other words the provision of tube connecting pieces—on the rear side has been left out. On the contrary, the rear-side frame, which is formed by the tubes 3, of the structure 1 is formed as a downwardly open, U-shaped profile which is covered by a display surface 8C for the purpose of darkening the internal space 5. Said profile is fastened, in a similar manner as the display surfaces 8A, 8B in FIG. 6 and FIG. 7, to the outside of the tube 3 of the construction 1 by an eyelet connection 26. The display surface 8C which is designed as the back wall has a size of 7.3 m×6 m here.

Figure 9:
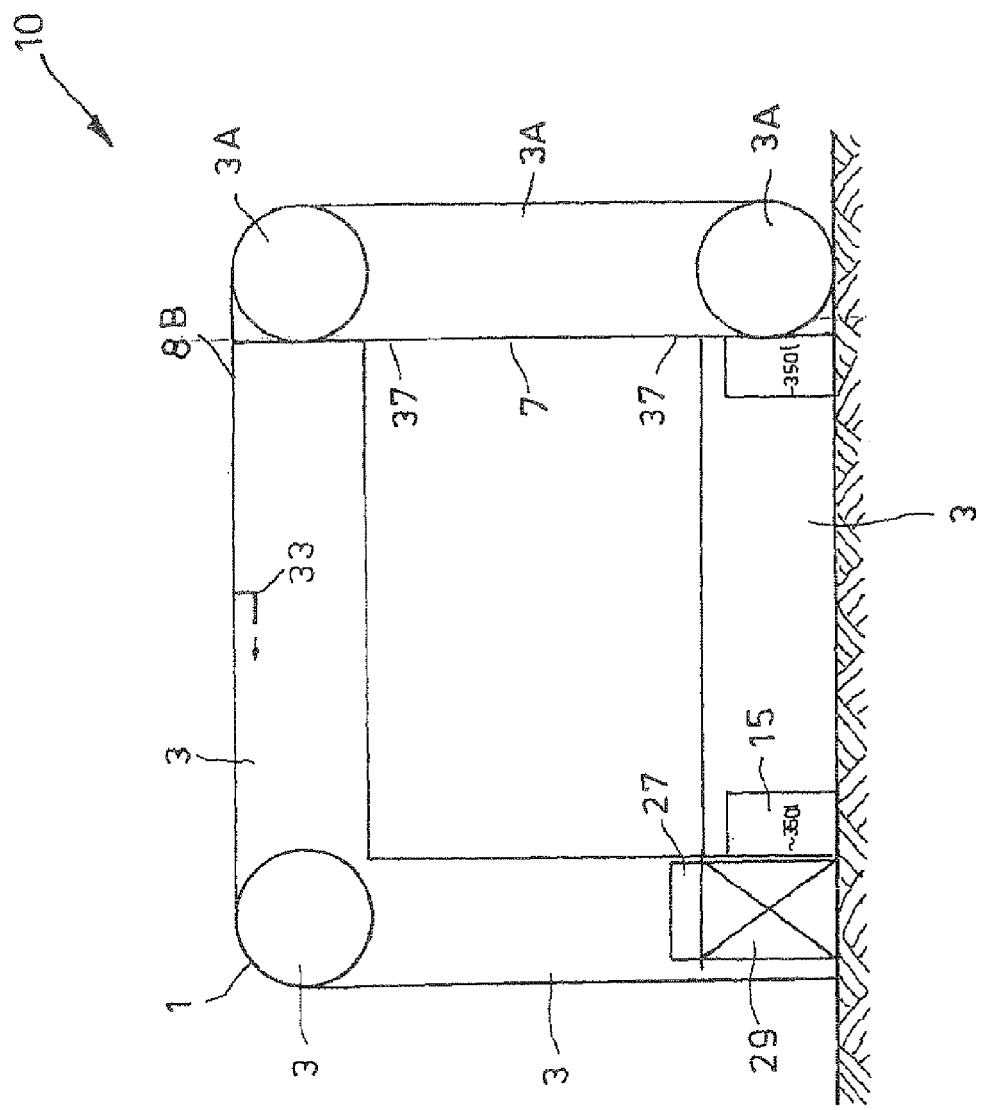
FIG. 9 shows a sectional view of a large-sized projection screen of FIG. 5 along the line A-A.

The sectional drawing illustrated in FIG. 9 shows a view along the line A-A in FIG. 5. In addition to the parts which are provided with the same reference numbers as in the previous drawings, a drainage 33 which is to be designed in accordance with requirements is furthermore provided in FIG. 9 on the display surface 8B in order to form a water drain on the roof. Furthermore, a shadow frame 37 which surrounds the rear projection surface 7 is illustrated in FIG. 9. The shadow frame 37 has a width of approximately 1.5 m. The shadow projection of the shadow space formed by the tubes 3A of the structure 1 goes beyond said shadow frame in order to protect the display surface 7 against light incidence and thereby, in particular, to improve the capability of the large-sized projection screen 10 to project in daylight conditions.

Figure 10:
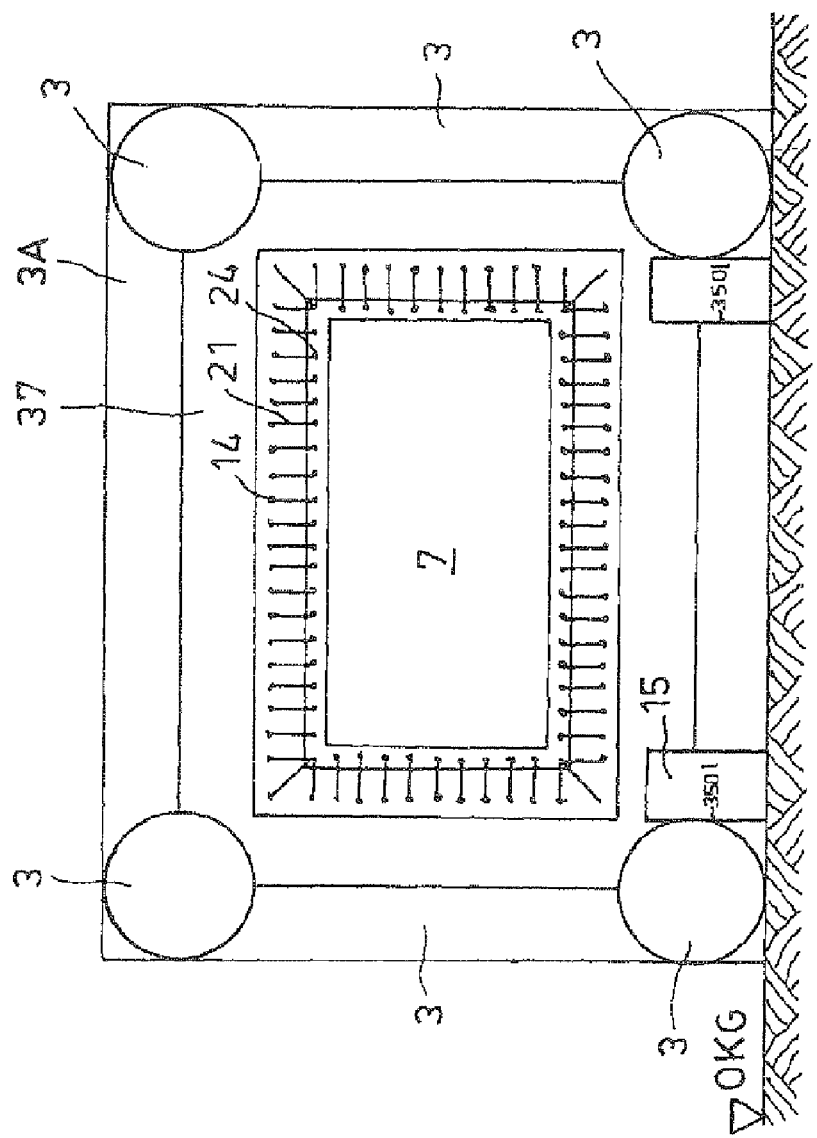
FIG. 10 shows a sectional view of a large-sized projection screen of FIG. 6 along the line B-B.

FIG. 10 shows a sectional view of the large-sized projection screen 10 along the line B-B in FIG. 6. In this case, the reference numbers used in the previous drawings have been used again for the same elements.

Figure 11:
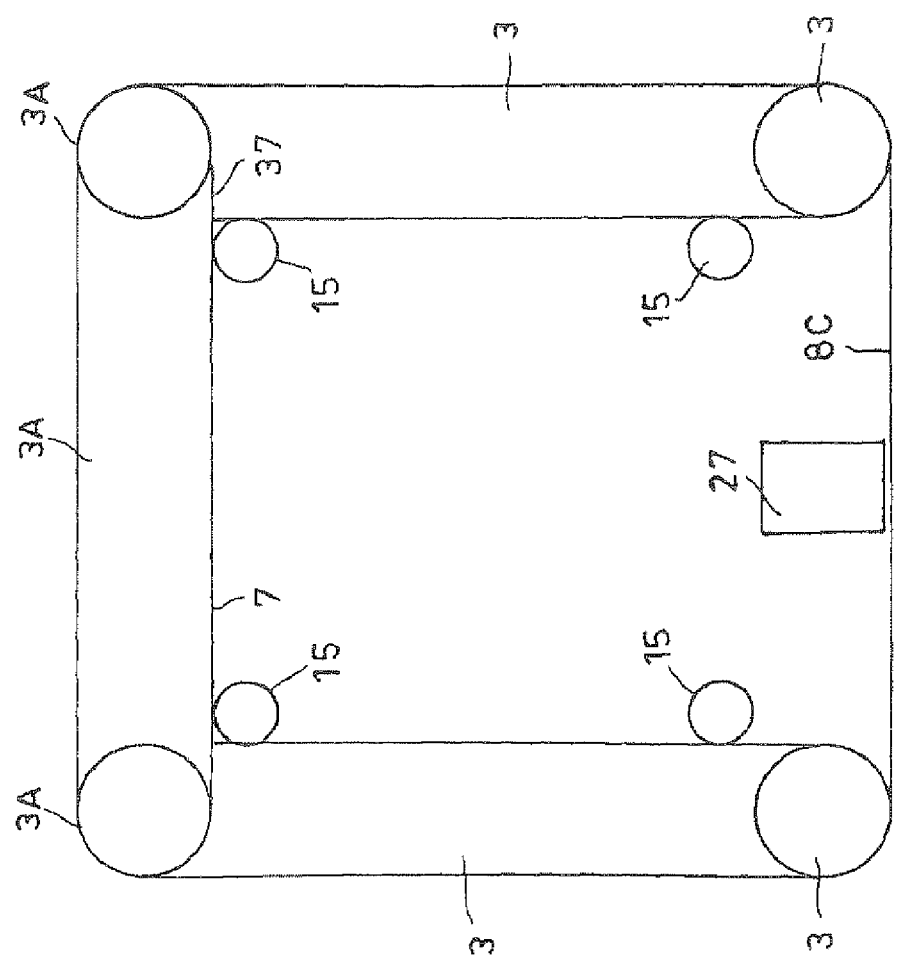
FIG. 11 shows a sectional view of a large-sized projection screen of FIG. 8 along the line C-C.

FIG. 11 shows a sectional view of the large-sized projection screen 10 along the line C-C in FIG. 8. Again, the reference numbers which have already been used previously have been used for the same elements.

In order to provide a large-sized transportable projection screen 10 with improved stability and at the same time to realize the possibility of improved projection in daylight conditions, the invention starts from a large-sized transportable projection screen 10, having a fillable, shape-variable hollow body in the form of a structure made of tubes 3, 3A, 3B which can be crammed together. The invention makes provision here for a three-dimensional internal space 5 which is surrounded by the structure to be defined, with the tubes 3, 3A, 3B being oriented in three directions in space and with the internal space being bounded by at least one display surface 7 which is arranged on an edge formed by one part of the tubes.

The invention claimed is:

1. A large-sized transportable projection screen (10), comprising a fillable, shape-variable hollow body (1) in the form of a structure made of fillable tubes (3, 3A, 3B), which are oriented in three directions in space (x, y, z), wherein a three-dimensional internal space (5) which is defined by the structure (1) is bounded on all sides and by at least one display surface (7, 8) which is arranged on an edge formed by one part of the tubes (3A), wherein at least one display surface in the form of a rear projection surface (7) is formed, and the internal space (5) forms a space which is darkened against light incidence from the outside, and the rear projection surface (7) is arranged on a side of the tubes (3A) which faces the internal space (5).

2. The large-sized projection screen (10) as claimed in claim 1, wherein the all-sided boundary has light-proof darkening surfaces.

3. The large-sized projection screen (10) according to claim 2, wherein the darkening surfaces are in the form of display surfaces (7, 8).

4. The large-sized projection screen (10) as claimed in claim 1, wherein the tubes (3, 3A, 3B) define the internal space (5) on all sides.

5. The large-sized projection screen (10) as claimed in claim 4, wherein the tubes (3, 3A, 3B) form a bordering structure (1).

6. The large-sized projection screen (10) as claimed in claim 1, wherein the tubes (3, 3A, 3B) are formed from a flexible two-wall material, between the two walls of which connections which define a predetermined distance between the walls of the two-wall material are arranged.

7. The large-sized projection screen (10) as claimed in claim 1, wherein the tubes (3, 3A, 3B) communicate with one another via filling openings.

8. The large-sized projection screen (10) as claimed in claim 1, wherein the structure (1) is free from planar, fillable partial hollow bodies.

9. The large-sized projection screen (10) as claimed in claim 1, wherein a light shield is arranged at the edge.

10. The large-sized projection screen (10) as claimed in claim 9, wherein the light shield has an upper and lateral panel.

11. The large-sized projection screen (10) as claimed in claim 1, wherein a tube (3, 3A, 3B) which forms the edge has a diameter which corresponds at least to one third of the height of the display surface (7).

12. The large-sized projection screen (10) as claimed in claim 1, further including a further display surface is formed in the form of a projection surface (7, 8).

13. The large-sized projection screen (10) as claimed in claim 1, wherein a projector for rear projection onto the projection surface (7) is arranged in the internal space (5) in an adjustable manner.

14. The large-sized projection screen (10) as claimed in claim 13, wherein a display surface is formed as the projection surface (7) in the form of a semi-transparent screen.

15. The large-sized projection screen (10) as claimed in claim 14, wherein a further display surface (8) is formed in the form of a printing surface.

16. The large-sized projection screen (10) as claimed in claim 14, wherein the display surface is formed in the form of a perforated screen.

17. The large-sized projection screen (10) as claimed in claim 1, wherein at least one of the tubes (3, 3A, 3B) which forms the edge has an eyelet strip (14).

18. The large-sized projection screen (10) as claimed in claim 1, wherein at least one point on the edge of a base area (4) of the structure (1) is free from tubes.

19. The large-sized projection screen (10) as claimed in claim 1, wherein the structure (1) defines a cuboid internal space (5).

* * * * *